(No Model.)
V. P. TRAVERS.
HAMMOCK.
No. 330,941. Patented Nov. 24, 1885.
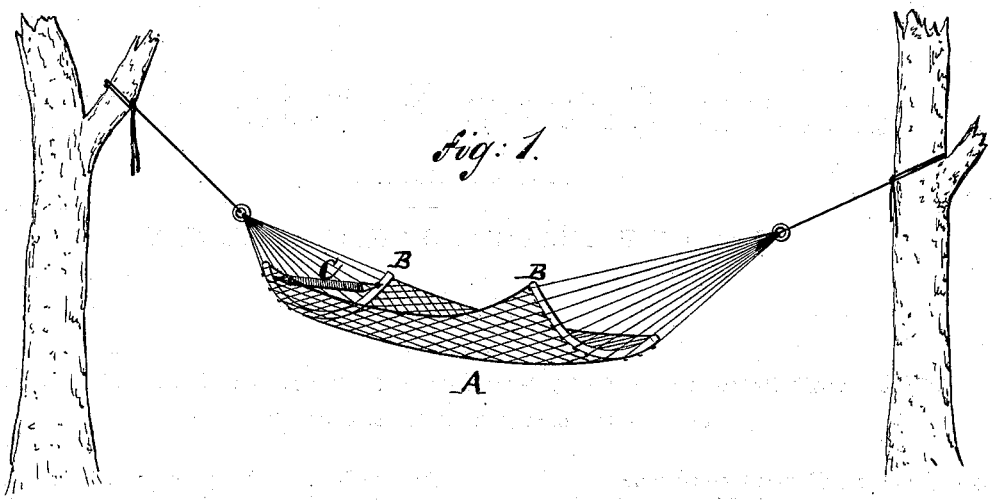
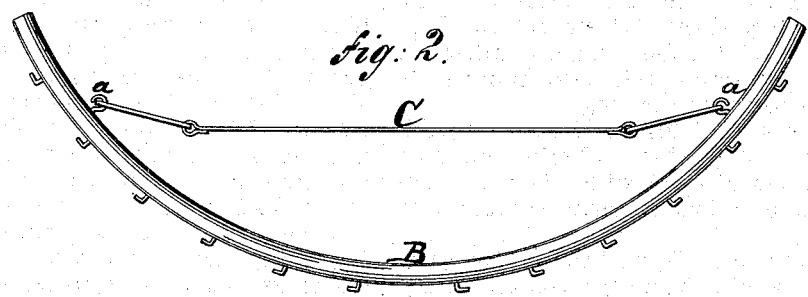
WITNESSES:
A. Schehl.
John M. Speer.
INVENTOR
Vincent P. Travers
BY Briesen & Steele
ATTORNEY

UNITED STATES PATENT OFFICE.

VINCENT P. TRAVERS, OF NEW YORK, N. Y.

HAMMOCK.

SPECIFICATION forming part of Letters Patent No. 330,941, dated November 24, 1885.

Application filed May 16, 1885. Serial No. 165,717. (No model.)

*To all whom it may concern:*

Be it known that I, VINCENT P. TRAVERS, a resident of New York city, in the county and State of New York, have invented an Improved Head-Rest Attachment to Hammocks, of which the following is a full, clear, and exact description, reference being made to the accompanying drawings.

This invention relates to an improved head-rest for hammocks; and it consists in combining such head-rest directly with the rigid hammock-spreader, all as hereinafter more fully described.

In the drawings, Figure 1 represents a perspective view of a hammock containing my improvement. Fig. 2 is a side view of the spreader carrying the head-rest. Fig. 3 is a top view of the same.

A is a hammock of suitable construction. B B are spreaders for holding the hammock laterally distended, said spreaders being of substantially the kind specified in Letters Patent No. 221,754, granted me November 18, 1879. In that former patent there was also shown a head-rest which was directly attached to the hammock; but in use I find that when the head-rest is attached to the hammock, there being also a spreader in the hammock, the head-rest will when weighted strain the hammock in the direction opposite to the strain produced by the spreader. Moreover, the full length of the hammock is not utilized if the head-rest is separate from the spreader.

According to my present invention the head-rest C is secured to the spreader B, as shown in Figs. 2 and 3—that is to say, the spreader, being of the arched form shown, has attached to its concave upper side the ends of the head-rest C, which is substantially straight. The spreader, may have hooks *a a* to receive the ends of the head-rest, or analogous fastenings for securing the latter.

I do not claim putting a cushion on a hammock or on the straight end piece of a hammock.

What I claim is—

The arched hammock-spreader B, combined with the substantially-straight head-rest C, which is attached to the concave upper side of said spreader, substantially as herein shown and described.

VINCENT P. TRAVERS.

Witnesses:
HARRY M. TURK,
JOHN M. SPEER.